United States Patent [19]

Matsuda et al.

[11] Patent Number: 4,504,318
[45] Date of Patent: Mar. 12, 1985

[54] PROCESS FOR PRODUCING PLASTIC CONCRETE

[75] Inventors: Hideaki Matsuda; Takasi Saheki, both of Marugame, Japan

[73] Assignee: Okura Kogyo Kabushiki Kaisha, Japan

[21] Appl. No.: 547,393

[22] Filed: Oct. 31, 1983

[30] Foreign Application Priority Data

Jan. 20, 1983 [JP] Japan .................................. 58-6685

[51] Int. Cl.$^3$ ............................................. C04B 7/35
[52] U.S. Cl. ....................................... 106/90; 106/97; 106/104; 106/121; 524/4; 524/5
[58] Field of Search ................... 106/90, 97, 104, 121; 524/4, 5

[56] References Cited

U.S. PATENT DOCUMENTS

| | | | |
|---|---|---|---|
| 3,692,728 | 9/1972 | Bonnel | 106/104 |
| 3,850,651 | 11/1974 | Duncan et al. | 106/90 |
| 3,950,295 | 4/1976 | Yamaguchi et al. | 106/90 |
| 4,202,809 | 5/1980 | Eash | 106/90 |

*Primary Examiner*—James Poer
*Attorney, Agent, or Firm*—Jacobs & Jacobs

[57] ABSTRACT

A light-weight high-strength plastic concrete is produced by forming a water-in-oil type inverted emulsion from a cement slurry, vinyl monomers, and a polyalkylene glycol derivative having terminal carboxyl groups, said polyalkylene glycol being an addition product of a polyalkylene glycol shown by the following general formula and a dibasic acid anhydride

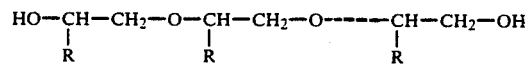

wherein R represents an alkyl group having one or more alkyl group and polymerizing and hardening the inverted emulsion and drying it.

9 Claims, 1 Drawing Figure

PROCESS FOR PRODUCING PLASTIC CONCRETE

FIELD OF THE INVENTION

This invention relates to a process for efficiently producing light-weight and high strength plastic concrete showing less shrinkage by forming a water-in-oil type emulsion of vinyl monomers and a cement slurry in the presence of a polyalkylene glycol derivative having terminal carboxyl groups, which is an addition product of polyalkylene glycol and a dibasic acid anhydride, and hardening and drying the emulsion.

BACKGROUND OF THE INVENTION

Cement concrete is widely used in the fields of civil engineering and construction industry at present but such a concrete has faults that it has heavy weight and is brittle. In order to reduce the weight of cement concrete, it is required to introduce fine foams in cement slurry or intermixing light-weight aggregates with cement slurry but such an attempt is poor in practicability since the concrete shows large shrinkage by drying, creep, etc., as well as is inferior in strength. For overcoming these difficulties, a process is employed at present wherein cement concrete is cured under high-temperature and high-pressure saturated vapor. However, the foregoing method is yet insufficient for obtaining high-strength concrete.

As an attempt for greatly increasing the physical or mechanical strength of light-weight concrete, polymer-impregnated concrete is proposed. Such a concrete is prepared by impregnating a light-weight concrete base material with a vinyl monomer and polymerizing the vinyl monomer by the irradiation of radiation or by impregnating a light-weight concrete base material with a vinyl monomer having previously mixed with a polymerization initiator and polymerizing the vinyl monomer by heating. The physical strength of the polymer-impregnated concrete obtained by the foregoing process is greatly improved as compared to the base material as well as the elastic property, chemical resistance, freezing and melting resistance, etc., of the concrete are also improved. However, polymer-impregnated concrete has various problems in productivity. That is, there are such problems that firstly, for effectively improving the strength of the polymer-impregnated concrete, it is required to previously dry the impregnated base material so that the water content thereof becomes lower than 0.5%, secondly, radiation must be treated in one process or a polymerization by heating in another process is accompanied by a large loss of vinyl monomer and is hence uneconomical, thirdly, the working step is complicated, etc. These problems result in increasing the product cost of polymer-impregnated concrete to prevent the practical use of polymer-impregnated concrete.

SUMMARY OF THE INVENTION

As the result of various investigations on obtaining a process of efficiently producing light-weight and high-strength plastic concrete, the inventors have discovered that vinyl monomers form a low-viscous water-in-oil type inverted emulsion in the presence of a polyalkylene glycol derivative having terminal carboxyl groups, which is an addition product of a polyalkylene glycol represented by the following general formula and a dibasic acid anhydride $$HO-CH-CH_2-O-CH-CH_2-O----CH-CH_2-OH$$
$$\quad\;\; |\qquad\qquad\;\;\; |\qquad\qquad\qquad\quad\; |$$
$$\quad\;\; R\qquad\qquad\;\; R\qquad\qquad\qquad\quad R$$

wherein R represents an alkyl group having one or more carbon atoms and a cement slurry, and further the inventors have succeeded in producing a light-weight high-strength plastic concrete at a high efficiency by polymerizing the foregoing inverted emulsion in the presence of a polymerization catalyst while hardening the cement and drying it.

That is, the invention is a process of producing a plastic concrete which comprises forming a water-in-oil type inverted emulsion of vinylmonomers in the presence of a polyalkylene glycol derivative having terminal carboxyl groups, which is an addition product of the polyalkylene glycol shown by the foregoing general formula and a dibasic acid anhydride, and a cement slurry and polymerizing the inverted emulsion in the presence of a polymerization catalyst while hardening the cement.

The feature of this invention is in the point of discovering a novel process of producing a plastic concrete by utilizing a low-viscous water-in-oil type inverted emulsion, whereby the reduction of the weight of a cement concrete and the reinforcement of the concrete by the introduction of a polymer are simultaneously achieved.

DETAILED DESCRIPTION OF THE INVENTION

Figure 1:
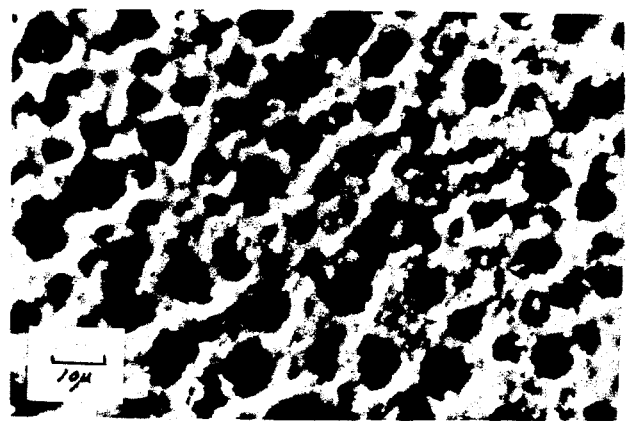
FIG. 1 is a microscopic photograph of the light-weight plastic concrete of this invention obtained in Example 7.

The specific gravity of the plastic concrete obtained by the process of this invention can be desirably selected by controlling the amount of water added to the cement. That is, if the amount of water to cement is larger, the specific gravity of the plastic concrete obtained by drying the cured product is lower, while if the amount of water is smaller, the specific gravity is higher. Also, the water-in-oil type emulsion obtained in the process of this invention has a low viscosity as the feature thereof and can be easily mixed with organic or inorganic fillers and reinforcing agents. The plastic concrete thus obtained may be used as a water-containing hardened product without drying.

Now, the inverted emulsion in this invention is produced by adding a cement slurry to vinyl monomers in the presence of the foregoing polyalkylene glycol derivative followed by vigorously stirring. Also, if necessary, additives such as a reinforcing agent, a light-weight aggregate, a flame retardant agent, a filler, a coloring agent, etc., may be added to the mixture.

The polyalkylene glycol used for preparing the above-described polyalkylene glycol derivative is shown by the foregoing general formula and preferred examples of it are polypropylene glycol, polybutylene glycol, etc. It is proper that the mean molecular weight of the polyalkylene glycol is in a range of 1,000 to 10,000, preferably 2,000 to 5,000. If the mean molecular weight of the polyalkylene glycol is less than 1,000, the inverted emulsion is reluctant to form and if the mean molecular weight is larger than 10,000, the viscosity of the emulsion becomes too high, whereby making the treatment of the emulsion inconvenient.

There is no particular restriction about the dibasic acid anhydride to be added to the terminal hydroxy groups of the aforesaid polyalkylene glycol and examples of the dibasic acid anhydride are phthalic anhydride, succinic anhydride, maleic anhydride, hexahydrophthalic anhydride, etc., but in particular, maleic anhydride and succinic anhydride by which the addition reaction easily proceed are preferred. In addition, when a dibasic acid anhydride having a double bond, such as maleic anhydride is added to the terminal hydroxy groups of the foregoing polyalkylene glycol, the terminal double bonds of the polyalkylene glycol derivative cause copolymerization with vinyl monomers, whereby the polyalkylene glycol derivative is incorporated in the polymer. Thus, the physical strength of the plastic concrete obtained is generally high. This is profitable for producing high-strength plastic concrete.

The above-described polyalkylene glycol derivative has terminal carboxy groups bonded thereto by an ester bond and the terminal carboxy groups are neutralized by a metal cation such as $Ca^{++}$, $Mg^{++}$, etc., generated from a cement slurry in the step of mixing the cement slurry and vinyl monomers and vigorously stirring the mixture. The neutralized product composed of the metal cation of the polyalkylene glycol derivative formed by the mechanism as described above act as effective water-in-oil type emulsifier for vinyl monomers, whereby a water-in-oil type inverted emulsion is formed.

As described above, according to the process of this invention, the polyalkylene glycol derivative can be used as it is without need of previously neutralizing the polyalkylene glycol derivative with a basic material, etc., and hence a neutralization step becomes unnecessary, which is profitable in industrial production. In other words, it is one of the excellent features of this invention that a neutralization reaction occurs in the step of adding a cement slurry to form an inverted emulsion.

There is no particular restriction on a vinyl monomer used for producing the foregoing inverted emulsion and examples of the vinyl monomers are styrene, α-methylstyrene, acrylic acid esters, methacrylic acid esters, acrylonitrile, divinylbenzene, diacrylic acid esters or methacrylic acid esters of an alkylene glycol, acrylic acid esters or methacrylic acid esters of a polyhydric alcohol, etc. These monomers may be used solely or as a mixture of them. For improving the heat resistance and other properties of the vinyl polymer formed, it is generally preferred to use the vinyl monomer together with a divinyl compound or a trivinyl compound such as ethylene glycol dimethacrylate, trimethylolpropane trimethacrylate, etc.

There is also no particular restriction on cement used for producing the cement slurry and there are Portland cement, blast furnace cement, fly ash cement, alumina cement, magnesia cement, etc. The cement slurry is prepared by mixing well cement and water. There is no particular restriction on the weight ratio but it is preferred that the cement/water ratio be about 100/20 to about 100/500 by weight ratio.

The amount of the polyalkylene glycol derivative used for preparing the inverted emulsion is generally about 1 to 50 parts by weight, preferably about 3 to 30 parts by weight per 100 parts by weight of the vinyl monomer. If the amount of the polyalkylene glycol derivative is larger than 50 parts by weight, the viscosity of the inverted emulsion obtained becomes higher and the properties of the plastic concrete obtained by curing and hardening the inverted emulsion are not good. Also, if the amount of the polyalkylene glycol derivative is less than 1 part by weight, a stable inverted emulsion is not obtained.

Since the viscosity of the inverted emulsion thus obtained is generally low, the inverted emulsion can be cast even when the emulsion is mixed with organic or inorganic filler and/or reinforcing agent. This is one of the features of this invention and is very convenient in the case of producing casts.

Then, the inverted emulsion prepared as described above is polymerized in the presence of a polymerization catalyst and in this case, a radical forming agent or a redox catalyst may be used as the polymerization catalyst. There is no particular restriction about the polymerization temperature.

In this invention, cement is further hardened while polymerizing the vinyl monomer as described above and a hardening method employed for ordinary cement may be used for hardening the cement in this invention. For efficiently hardening the cement, the cement may be cured in saturated water vapor or in water.

The water-containing plastic concrete obtained by polymerizing the vinyl monomers and hardening the cement by the manners as described above may be used as a water-containing hardened product without drying. In particular, when a high strength is required rather than light weight, high specific gravity but high-strength plastic concrete can be obtained by producing an inverted emulsion while reducing the content of water in the step of producing a cement slurry as low as possible and then polymerizing and hardening the inverted emulsion. Furthermore, by incorporating crushed stone, sand, perlite, glass fibers, metal fibers, synthetic fibers, etc., in the inverted emulsion in the case of producing the emulsion, plastic concrete having various properties can be produced. Also, by the combination of a room temperature hardening type polymerization catalyst and a quick hardening cement, the inverted emulsion can be polymerized and hardened in a short period of time after pouring the emulsion in a mold, whereby the shortening of the time necessary for the completion of work in the fields of civil engineering and construction industry can be expected.

For obtaining light-weight plastic concrete, the water-containing plastic concrete may be dried to remove water therefrom. Also, by changing the mixing ratio of cement and water in the case of producing a cement slurry, light-weight plastic concretes having various specific gravities can be produced. When a light weight and a high strength are required, it is effective to increase the polymer content in the plastic concrete. Furthermore, the physical strength of the plastic concrete can be also increased by incorporating glass fibers, metal fibers, synthetic fibers, etc., in the cement slurry. When a fire-retarding property is required, light-weight plastic concrete having a high fire-retarding property can be produced by incorporating a flame retardant agent such as aluminium hydroxide, etc., in the cement slurry.

Since the plastic concrete of this invention scarecely causes shrinkage by drying, large cast products can be produced.

As described above, the plastic concrete obtained by the process of this invention can be used for not only civil engineering and construction industry but also various uses such as casting materials, etc.

Then, the invention will further be explained more practically by referring to the following examples and comparison examples.

EXAMPLE 1

With 80 parts by weight of styrene, 20 parts by weight of trimethylolpropane trimethacrylate (hereinafter, is referred to as TMPT), and 10 parts by weight of a maleic anhydride addition product of polybutylene glycol having a mean molecular weight of 3,000 was mixed 600 parts by weight of a slurry composed of 400 parts by weight of Portland cement and 200 parts by weight of water with stirring to provide a low-viscous cement-containing inverted emulsion having good casting property. To the inverted emulsion were added 0.5% by weight of a 10% styrene solution of cobalt naphthenate and 0.5% by weight of a 55% dimethyl phthalate solution of methyl ethyl ketone peroxide, the resultant mixture was poured into a mold followed by performing polymerization for 6 hours at 60° C. to provide a water-containing polymerized product. The product was cured for 4 days in a chamber maintained at a constant temperature of 40° C. and a constant humidity of 95% RH to further harden the cement and then dried to provide a light weight hard and tough plastic concrete.

EXAMPLE 2

With 80 parts by weight of styrene, 20 parts by weight of TMPT, and 14 parts by weight of a maleic anhydride addition product of polypropylene glycol having a mean molecular weight of 3,000 (hereinafter, is referred to as PPGMA-3,000) was mixed 700 parts by weight of a slurry composed of 100 parts by weight of Portland cement, 200 parts by weight of river sand, and 400 parts by weight of water with stirring to provide a cement-containing inverted emulsion having good casting property. The inverted emulsion was polymerized and cured by the same manner as in Example 1 and then dried to provide a light and tough plastic concrete.

EXAMPLE 3

With 80 parts by weight of methyl methacrylate, 20 parts by weight of TMPT, and 8 parts by weight of PPGMA-3,000 was mixed 600 parts of a slurry composed of 200 parts by weight of Portland cement and 400 parts by weight of water with stirring to provide a cement-containing inverted emulsion having good casting property. The inverted emulsion was polymerized and cured by the same manner as in Example 1 and dried to provide a light and tough plastic concrete.

EXAMPLE 3

With 80 parts by weight of methyl methacrylate, 20 parts by weight of TMPT, and 8 parts by weight of PPGMA-3,000 was mixed 600 parts by weight of a slurry composed of 200 parts by weight of Portland cement and 400 parts by weight of water with stirring to provide a cement-containing inverted emulsion having good casting property. To the inverted emulsion were added 0.5% by weight of a 80% cumene solution of cumene hydroperoxide and 0.05% by weight of vanadyl acetylacetonate and the mixture was poured into a mold and polymerized for 4 hours at 60° C. to provide a water-containing polymerized material. The material was cured by the same manner as in Example 1 to further harden the cement and then dried to provide a light and tough plastic concrete.

EXAMPLE 4

With 80 parts by weight of styrene, 20 parts by weight of TMPT, and 8 parts by weight of PPGMA-3,000 was mixed 600 parts by weight of a slurry composed of 200 parts by weight of Portland cement and 400 parts by weight of water together with 20 parts by weight of glass fibers having a mean fiber length of 1.0 mm with stirring to provide a cement-containing inverted emulsion. To the inverted emulsion were added 0.5% by weight of benzoyl peroxide and 0.025% by weight of vanadyl acetylacetonate and the mixture was poured into a mold and polymerized for 6 hours at 60° C. to provide a water-containing polymerized material. The water-containing polymerized material was cured by the same manner as in Example 1 to further harden the cement and then dried to provide a light and tough plastic concrete.

EXAMPLE 4

With 80 parts by weight of styrene, 20 parts by weight of TMPT, and 8 parts by weight of PPGMA-3,000 was mixed 600 parts by weight of a slurry composed of 200 parts by weight of Portland cement and 400 parts by weight of water together with 20 parts by weight of glass fibers having a mean fiber length of 1.0 mm with stirring to provide a cement-containing inverted emulsion. To the inverted emulsion were added 0.5% by weight of benzoyl peroxide and 0.025% by weight of vanadyl acetylacetonate and the mixture was poured into a mold and polymerized for 6 hours at 60° C. to provide a water-containing polymerized material. The water-containing polymerized material was cured by the same manner as in Example 1 to further harden the cement and then dried to provide a light and tough plastic concrete.

EXAMPLE 5

With 60 parts by weight of styrene, 20 parts by weight of acrylonitrile, 20 parts by weight of TMPT, and 8 parts by weight of PPGMA-3,000 was mixed 600 parts by weight of a slurry composed of 200 parts by weight of Portland cement and 400 parts by weight of water with stirring to provide a cement-containing inverted emulsion having good casting property. To the inverted emulsion were added 0.5% by weight of benzoyl peroxide and 0.025% by weight of vanadyl acetylacetonate and the mixture was poured into a mold and polymerized for 4 hours at 60° C. to provide a water-containing polymerized material. The water-containing polymerized material was cured by the same manner as in Example 1 to further harden the cement and then dried to provide a light-weight plastic concrete.

EXAMPLE 6

With 60 parts by weight of styrene, 20 parts by weight of acrylonitrile, 20 parts by weight of TMPT, and 8 parts by weight of PPGMA-3,000 was mixed 600 parts by weight of a slurry composed of 200 parts by weight of Portland cement and 400 parts by weight of water together with 20 parts by weight of glass fibers having a mean fiber length of 1.0 mm with stirring to provide a cement-containing inverted emulsion. To the inverted emulsion were added 0.5% by weight of benzoyl peroxide and 0.025% by weight of vanadyl acetylacetonate and the mixture was poured into a mold and polymerized for 16 hours at room temperature to provide a water-containing polymerized material. The water-containing polymerized material was cured by the same manner as in Example 1 to further harden the cement and then dried to provide a light-weight plastic concrete.

EXAMPLE 7

With 80 parts by weight of styrene, 20 parts by weight of TMPT, and 8 parts by weight of PPGMA-3,000 was mixed 600 parts by weight of a slurry composed of 200 parts by weight of Portland cement and 400 parts by weight of water with stirring to provide a cement-containing inverted emulsion having good casting property. The inverted emulsion was cured by the same manner as in Example 4 and dried to provide a light-weight plastic concrete.

COMPARISON EXAMPLE 1

A cement slurry obtained by mixing well 100 parts by weight of Portland cement, 360 parts by weight of river sand, and 72 parts by weight of water with stirring was poured into a mold and then withdrawn from the mold after 20 hours. The product was cured for 7 days in a chamber maintained at a constant temperature of 40° C. and a constant humidity of 95% RH, and then dried to provide a concrete block.

COMPARISON EXAMPLE 2

A cement slurry obtained by mixing well 100 parts by weight of Portland cement, 109 parts by weight of perlite, and 273 parts by weight of water with stirring was treated by the same manner as in Comparison example 1 to provide a light-weight concrete block for measuring physical strength.

COMPARISON EXAMPLE 3

A cement slurry obtained by mixing well 100 parts by weight of Portland cement, 24 parts by weight of foamed polystyrene beads, and 40 parts by weight of water with stirring was treated by the same manner as in Comparison example 1 to provide a light-weight concrete block.

COMPARISON EXAMPLE 4

The production of a cement-containing inverted emulsion was attempted by the same manner as in Example 5 using polypropylene glycol having a mean molecular weight of 3,000 in place of PPGMA-3,000 but no inverted emulsion was formed.

COMPARISON EXAMPLE 5

The production of a cement-containing inverted emulsion was attempted by the same manner as in Example 5 using a simple mixture of polypropylene glycol having a mean molecular weight of 3,000 and maleic anhydride at 1:1 by equivalent ratio in place of PPGMA-3,000 but no inverted emulsion was formed as the case of Comparison example 4.

From the results in Comparison examples 4 and 5, it is clear that for producing a cement-containing inverted emulsion from a vinyl monomer and cement slurry, the presence of a polyalkylene glycol derivative having carboxyl groups bonded by ester bonds are necessary.

The specific gravity, the bending strength, and the compressive strength of the light-weight plastic concretes and light-weight concretes obtained in Examples 1 to 7 and Comparison examples 1 to 3 are shown in Table 1. Also, the aforesaid properties of a commercially available foamed concrete produced by curing in auto clave are shown in the same table, which are values shown in a catalogue.

From the results shown in the table, it is understood that the light-weight plastic concretes obtained by the process of this invention generally have high physical strength and, in particular, the reinforcing effect of glass fibers on the bending strength is remarkable as shown in Examples 4 and 6.

TABLE 1

| | Physical strength of concrete | | |
|---|---|---|---|
| Sample No. | Specific gravity | Bending strength (kg/cm$^2$) | Compressive strength (kg/cm$^2$) |
| Example 1 | 1.38 | 117.6 | 219.8 |
| Example 2 | 0.63 | 17.5 | 38.8 |
| Example 3 | 0.59 | 43.1 | 55.5 |
| Example 4 | 0.61 | 97.8 | 103.6 |
| Example 5 | 0.62 | 46.9 | 48.1 |
| Example 6 | 0.59 | 76.9 | 55.0 |
| Example 7 | 0.59 | 43.8 | 71.9 |
| Comparison example 1 | 2.04 | 52.0 | 188.8 |
| Comparison example 2 | 0.55 | 6.3 | 15.4 |
| Comparison example 3 | 0.50 | 4.1 | 13.5 |
| Commercially available foamed concrete | 0.5–0.6 | 10.0 | 35.0 |

On the samples obtained in Examples 6 and 7, the acceleration test for weather resistance by weather-o-meter was performed and the results are shown in Table 2.

TABLE 2

| | Physical strength by weather-o-meter after 901 hours | |
|---|---|---|
| Sample No. | Bending strength (kg/cm$^2$) | Compressive strength (kg/cm$^2$) |
| Example 6 | 79.3 | 69.3 |
| Example 7 | 43.8 | 75.0 |

As is shown in the above results, there is a tendency of generally increasing the physical strength of the samples in the examples after 901 hours by weather-o-meter. As is described above, since the light-weight plastic concrete obtained by the process of this invention has not only high physical strength but also excellent weather resistance, the concrete can be used in the outdoor.

The microscopic photograph of the light-weight plastic concrete obtained in Example 7 is shown in FIG. 1. As is clear from the figure, the diameters of foams in the concrete are very fine as about 10μ and the foams have uniform distribution of diameters. Since foams of the concrete are invisible, a light-weight plastic concrete having beautiful external surface state different from conventional light-weight concrete can be obtained.

EXAMPLE 8

With 80 parts by weight of styrene, 20 parts by weight of TMPT, and 10 parts by weight of a succinic anhydride addition product of polypropylene glycol having a mean molecular weight of 3,000 (hereinafter, is referred to as PPGSA-3,000) was mixed 600 parts by weight of a slurry composed of 300 parts by weight of Portland cement and 600 parts by weight of water with stirring to provide a cement-containing inverted emulsion. The inverted emulsion was polymerized and cured by the same manner as in Example 4 and dried to provide a light-weight plastic concrete.

EXAMPLE 10

With 60 parts by weight of styrene, 20 parts by weight of acrylonitrile, 20 parts by weight of TMPT, and 10 parts by weight of PPGMA-2,000 was mixed 440 parts by weight of a slurry composed of 220 parts by weight of Portland cement and 220 parts by weight of water with stirring to provide a cement-containing inverted emulsion having a low viscosity and a good casting property. The inverted emulsion was polymerized and cured by the same manner as in Example 4 and then dried to provide a light-weight plastic cement.

EXAMPLE 11

By following the same procedure as in Example 10 except that 660 parts by weight of a slurry composed of 220 parts by weight of Portland cement and 440 parts by weight of water were used, a light-weight plastic concrete was obtained.

EXAMPLE 12

By following the same procedure as in Example 10 except that 1,200 parts by weight of a slurry composed of 440 parts by weight of Portland cement and 800 parts by weight of water and 40 parts by weight of glass fibers having mean fiber length of 0.45 mm were used, a light-weight plastic concrete was obtained.

COMPARISON EXAMPLE 6

By following the same procedure as in Example 11 except that calcium carbonate was used in place of Portland cement, a foamed product was obtained.

COMPARISON EXAMPLE 7

The same procedure as in Example 12 was followed except that calcium carbonate was used in place of Portland cement for producing an inverted emulsion but no inverted emulsion was formed.

Various properties of the plastic concretes obtained in Examples 8 to 12 and the foamed product obtained in Comparison example 6 are shown in Table 3. The property tests were performed according to ASTM.

considered to be caused by the absorption of water at hardening the cement.

In Comparison example 7, an inverted emulsion was not formed due to a too large amount of the slurry but as shown in Example 12, when the cement slurry was used, an inverted emulsion was formed even when the addition amount of the slurry was increased. It is one of the features of this invention that an inverted emulsion is formed even when a large amount of a cement slurry is used.

EXAMPLE 13

By following the same procedure as in Example 10 except that 110 parts by weight of Portland cement in 220 parts by weight of the cement was replaced with aluminium hydroxide, a light-weight plastic concrete was obtained.

EXAMPLE 14

By following the same procedure as in Example 11 except that 110 parts by weight of Portland cement in 220 parts by weight of the cement was replaced with aluminium hydroxide, a light-weight plastic concrete was obtained.

EXAMPLE 15

By following the same procedure as in Example 12 except that 200 parts by weight of Portland cement in 400 parts by weight of the cement was replaced with aluminium hydroxide, a light-weight plastic concrete was obtained.

Burning test according to ASTM was performed on the light-weight plastic concretes obtained in Examples 13 to 15 and the foamed product obtained in Comparison example 6 and the results are shown in Table 4.

TABLE 4

| Sample No. | Burning property (ASTM) | |
|---|---|---|
| | Evaluation | Burning rate (cm/min) |
| Example 13 | No burning | — |
| Example 14 | No burning | — |
| Example 15 | No burning | — |
| Comparison example 6 | Burning | 1.4 |

As is clear from the results of Table 4, all light-weight plastic concretes containing aluminium hydroxide

TABLE 3

| Sample No. | Various properties of light-weight plastic concretes and foamed product | | | | | |
|---|---|---|---|---|---|---|
| | Specific gravity | Bending strength (kg/cm$^2$) | Compressive strength (kg/cm$^2$) | Impact strength (Kg · cm/cm) | Heat distortion temperature (°C.) | Shore D hardness |
| Example 8 | 0.62 | 30.2 | 67.5 | 0.5 | 83.3 | 41.2 |
| Example 9 | 0.66 | 15.7 | 37.0 | 0.5 | 63.0 | 24.8 |
| Example 10 | 1.00 | 111.9 | 135.3 | 2.8 | 102.3 | 64.3 |
| Example 11 | 0.64 | 37.4 | 72.8 | 0.6 | 86.0 | 44.5 |
| Example 12 | 0.50 | 36.9 | 28.4 | 1.4 | 144.0 | 25.0 |
| Comparison example 6 | 0.50 | 12.8 | 22.8 | 0.4 | 82.0 | 22.9 |

Note
Impact strength: measured without notch.

Comparing Example 11 with Comparison example 6 shows that when other composition is same, the use of Portland cement clearly gives higher physical properties than the use of calcium carbonate. Also, the reason that the specific gravity of the light-weight plastic concrete using Portland cement became slightly higher is which is known as a flame retardant agent were evaluated as "no burning". On the other hand, the light-weight plastic concretes containing no aluminium hydroxide obtained in Examples 10 to 12 were also evaluated as "no burning" but there was generally a tendency that the flame remaining time prolonged.

EXAMPLE 16

With 80 parts by weight of styrene, 20 parts by weight of TMPT, and 15 parts by weight of PPGMA was mixed 1800 parts by weight of a slurry composed of 300 parts by weight of Portland cement, 300 parts by weight of aluminium hydroxide, and 1,200 parts by weight of water with stirring to provide a cement-aluminium hydroxide-containing inverted emulsion. The inverted emulsion was polymerized and cured by the same manner as in Example 4 and dried to provide a light-weight plastic concrete plate of 12 mm in thickness. The concrete plate was subjected to 2nd class flame retarding test (semi-non-combustible material test) according to JIS-A 1321 and the results are shown in Table 5.

TABLE 5

| Sample No. | Fire retarding property of plastic concrete (JIS-A1321) | | | | | |
|---|---|---|---|---|---|---|
| | TD$\theta$ (°C. min) | CA | (A) (sec) | (B) | (C) | (D) |
| Example 16 | 0 | 4.5 | 0 | none | none | no |

(A): Residual flame;
(B): Deformation;
(C): Presence of cracks reaching the back surface of the plate;
(D): Whether or not the exhaust gas temperature goes over a standard temperature within 3 minutes.

As is clear from the above results, the concrete plate passed the test as a semi-noncombustible material. On the other hand, when a light-weight plastic concrete containing no aluminium hydroxide was subjected to the same test as above, TD$\theta$ was generally high and the tendency of prolonging the residual flame time was observed.

As described above, in the plastic concrete of this invention, the flame retarding property can be easily improved by adding thereto a flame retardant agent such as aluminium hydroxide, which is very convenient in the case of using the plastic concrete as an interior material requiring a flame retarding property.

As stated above in the comparison of the examples of this invention and the comparison examples, the plastic concrete of this invention is a novel and useful material having a wide adaptability for various uses.

What is claimed is:

1. A process of producing a plastic concrete which comprises forming a water-in-oil inverted emulsion of vinyl monomers in the presence of a polyalkylene glycol derivative having terminal carboxyl groups, which is an addition product of a polyalkylene glycol represented by the following general formula and a dibasic acid anhydride

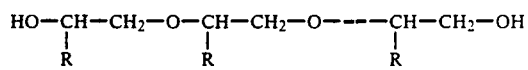

wherein R represents an alkyl group having one or more carbon atoms
and a cement slurry and polymerizing the inverted emulsion in the presence of a polymerization catalyst while hardening the cement.

2. The process as claimed in claim 1 wherein the polyalkylene glycol shown by the general formula, which combines with the dibasic acid anhydride by an ester bond, is polypropylene glycol or polybutylene glycol having a mean molecular weight of 2,000 to 5,000.

3. The process as claimed in claim 1 wherein the dibasic acid anhydride which combines with the hydroxy group of the polyalkylene glycol of the general formula by an ester bond is maleic anhydride or succinic anhydride.

4. The process as claimed in claim 1 wherein the vinyl monomer is styrene, methyl methacrylate, acrylonitrile, trimethylolpropane trimethacrylate, or ethylene glycol dimethacrylate.

5. The process as claimed in claim 1 wherein the mixing ratio of the vinyl monomer and the polyalkylene glycol derivative derived from the polyalkylene glycol shown by the general formula and the dibasic acid anhydride is 1 to 50 parts by weight per 100 parts by weight of the vinyl monomers.

6. The process as claimed in claim 5 wherein the mixing ratio is 3 to 30 parts by weight per 100 parts by weight of the vinyl monomers.

7. The process as claimed in claim 1 wherein the polymerization catalyst is cobalt naphthenate, vanadyl acetylacetonate, benzoyl peroxide, cumene hydroperoxide, methyl ethyl ketone peroxide or a mixture thereof.

8. The process as claimed in claim 1 wherein crushed stone, river sand, perlite, glass fibers, metal fibers, or synthetic fibers are added at the formation of the water-in-oil type inverted emulsion.

9. The process as claimed in claim 1 wherein a part of cement in the cement slurry is replaced with aluminium hydroxide at the formation of the water-in-oil type inverted emulsion.

* * * * *